United States Patent [19]
Otsuka et al.

[11] Patent Number: 5,444,603
[45] Date of Patent: Aug. 22, 1995

[54] PUSH-ON FIXER FOR SCREW ENGAGEMENT

[75] Inventors: Yasushi Otsuka; Masayoshi Unno; Hideki Ohashi, all of Shizuoka, Japan

[73] Assignee: Koito Manufacturing Co., Ltd., Tokyo, Japan

[21] Appl. No.: 273,129

[22] Filed: Jul. 14, 1994

[30] Foreign Application Priority Data

Jul. 19, 1993 [JP] Japan ............................ 5-177138
Oct. 5, 1993 [JP] Japan ........................... 5-053975 U

[51] Int. Cl.⁶ ..................... B60Q 1/06; F16B 39/284
[52] U.S. Cl. ............................ 362/66; 362/61; 362/419; 362/428; 362/273; 362/324; 362/289; 411/339; 411/526; 411/527; 411/218
[58] Field of Search ............. 362/66, 61, 285, 289, 362/418, 422, 424, 419, 80, 428, 273, 271, 274, 324, 288, 289; 411/338, 339, 525, 526, 527, 918

[56] References Cited

U.S. PATENT DOCUMENTS

| | | | |
|---|---|---|---|
| 4,503,486 | 3/1985 | Makita | 362/66 X |
| 4,574,334 | 3/1986 | Ingura | 362/66 |
| 4,709,306 | 11/1987 | Harris et al. | 362/66 X |
| 4,911,594 | 3/1990 | Fisher | 411/527 X |
| 5,047,904 | 9/1991 | Vraux | 362/66 |
| 5,077,642 | 12/1991 | Lisak | 362/66 |
| 5,258,894 | 11/1993 | Bivens | 362/289 X |

*Primary Examiner*—Ira S. Lazaras
*Assistant Examiner*—Thomas M. Sember
*Attorney, Agent, or Firm*—Sughrue, Mion, Zinn, Macpeak & Seas

[57] ABSTRACT

A push-on fixer for screw engagement in which a plurality of radially extending notches are formed in a circumferential edge region of a circular hole formed at a center portion of a thin discoid body, and a plurality of inner plate spring pieces are formed on the circumferential edge region of the circular hole so as to allow insertion of an aiming screw into the circular hole and so as to clamp the inserted aiming screw, is provided. An aiming screw is inserted into an aiming screw insertion hole of a lamp body of an automobile head lamp, and is retained so as to be prevented from coming out of the lamp body. A plurality of outer plate spring pieces which press against a push-on fixer abutment surface of the lamp body and a plurality of clamp release claws for releasing the clamping of the screw by the screw clamp plate spring pieces are formed on the outer circumferential edge of the thin discoid body.

10 Claims, 5 Drawing Sheets

PUSH-ON FIXER FOR SCREW ENGAGEMENT

BACKGROUND OF THE INVENTION

1. Field of the Invention

For the purposes of tilt adjustment (hereinafter referred to as "aiming") of an automobile head lamp, a lamp is provided with an aiming mechanism. Aiming is generally conducted by rotating an aiming screw which is inserted into a lamp body. The present invention relates to a push-on fixer for engaging the screw, which is used for preventing the aiming screw inserted into a lamp body of coming off of the lamp body.

2. Related Art

FIGS. 1 and 2 illustrate an aiming mechanism of a conventional automobile head lamp. FIG. 1 is a front view of the head lamp, and FIG. 2 is a vertical sectional view showing a profile (sectioned along the line II—II in FIG. 1) of the same head lamp. As shown in these drawings, a lamp body 1 and a front lens 2 define a lamp chamber space in which a reflector 3 is supported so as to be capable of being tilted by the aiming mechanism. A bulb 4 acting as a light source is installed in the reflector 3. The aiming mechanism consists of one pivot support 6a; a vertical aiming screw 6b which projects inside and outside lamp body 1, and is threadedly engaged with a reflector side nut (not illustrated) which is screwed onto this screw 6b; and a horizontal aiming screw 6c which similarly projects inside and outside the lamp body 1, and is threadedly engaged with a reflector side nut (not illustrated) which is screwed onto this screw 6c. By rotating the aiming screws 6b and 6c, the reflector 3 is tilted around the horizontal tilt axis $L_x$ and the vertical tilt axis $L_y$, thereby aiming the head lamp.

FIG. 3 is a sectional view which shows an enlargement of the lamp body insertion portion of the aiming screws. The aiming screw 6b (6c) passes through a screw insertion hole 1a of the lamp body 1 so as to project to both the front and rear of the lamp body. The screw is prevented from coming off from the lamp body 1 by a push-on fixer 7 while it is rotatably supported in screw insertion hole 1a. As shown in an enlarged manner in FIG. 4, the push-on fixer 7 has a structure where a plurality of notches 7b are formed in a central circular hole portion of a thin discoid body 7a, thereby forming a plurality of plate spring pieces 7c in an inner circumferential edge. These plate spring pieces 7c clamp an engagement portion 6d of the aiming screw 6b (6c), whereby the aiming screw 6b (6c) is prevented from coming off of the lamp body 1. Reference numeral 8 designates a wave washer for eliminating any axial backlash in the aiming screw bearing portion; the reference numeral 9a designates an O ring for ensuring waterproofing in the aiming screw bearing portion; and the reference numeral 9b designates a sliding washer.

In the above-mentioned structure of the aiming screw bearing portion, the push-on fixer 7 and the wave washer 8 are indispensable. The number of parts is correspondingly large, and the time required for assembly is long.

Regarding installation of the push-on fixer, the push-on fixer can be easily installed because the screw 6b (6c) can be inserted into the circular hole while deforming the plate spring pieces 7c. However, once the push-on fixer is installed, its removal is difficult, and repair of the aiming screw bearing portion is inconvenient. In addition, there has recently been a tendency where the lighting fixtures removed from scrapped automobiles are disassembled, and the materials are sorted for recycling. Unfortunately, much labor is required to remove the push-on fixer 7 from the lamp body 1.

SUMMARY OF THE INVENTION

The present invention was made in light of the above problems in the conventional technology. The object of the present invention is to provide a push-on fixer for aiming screw engagement whose removal is easy, and which not only prevents inadvertent removal of the aiming screw from the lamp body insertion portion, but also absorbs axial backlash.

In order to attain the above and other objects, a push-on fixer for engagement of an aiming screw is provided having a structure in which a plurality of radially extending notches are formed in a circumferential edge region of a circular hole formed at a center portion of a thin discoid body, and a plurality of inner plate spring pieces are formed on the circumferential edge region of the circular hole so as to allow insertion of the aiming screw into the circular hole and so as to clamp the inserted aiming screw, whereby the aiming screw inserted into a lamp body of an automobile head lamp is retained so as to be prevented from coming off from the lamp body, wherein the thin discoid body is cut and bent downward at its plurality of portions distributed substantially equidistantly along the outer circumferential edge of the thin discoid body so that a plurality of outer plate spring pieces which press against a push-on fixer abutment surface of the lamp body is formed by the cut portions, and in that the thin discoid body is raised upward at its plurality of portions distributed substantially equidistantly and corresponding to the inner plate spring pieces so that clamp release claws for releasing the clamping of the aiming screw from the inner plate spring pieces are formed by the raised portions.

When the aiming screw is inserted into the circular hole of the push-on fixer, the aiming screw clamping inner plate spring pieces are elastically deformed, and the smooth insertion of the aiming screw into the circular hole, that is, the smooth external fitting of the push-on fixer onto the aiming screw, can be accomplished. The inner plate spring pieces clamp the aiming screw which has been inserted into the circular hole, and prevent the aiming screw from coming off of the lamp body. Moreover, the plurality of outer plate spring pieces which are formed at the outer circumferential edge of the thin discoid body press against the push-on fixer abutment surface, and absorb axial backlash in the lamp body insertion portion of the aiming screw.

When the clamp release claws which are also formed at the outer circumferential edge of the thin discoid body are elastically deformed in the outward radial direction of the discoid body, the region from these claws to the plate spring pieces for clamping undergoes elastic or plastic deformation in being bent backward to the rear side, and the circular hole is widened.

DESCRIPTION OF THE PREFERRED EMBODIMENTS

Figure 1:
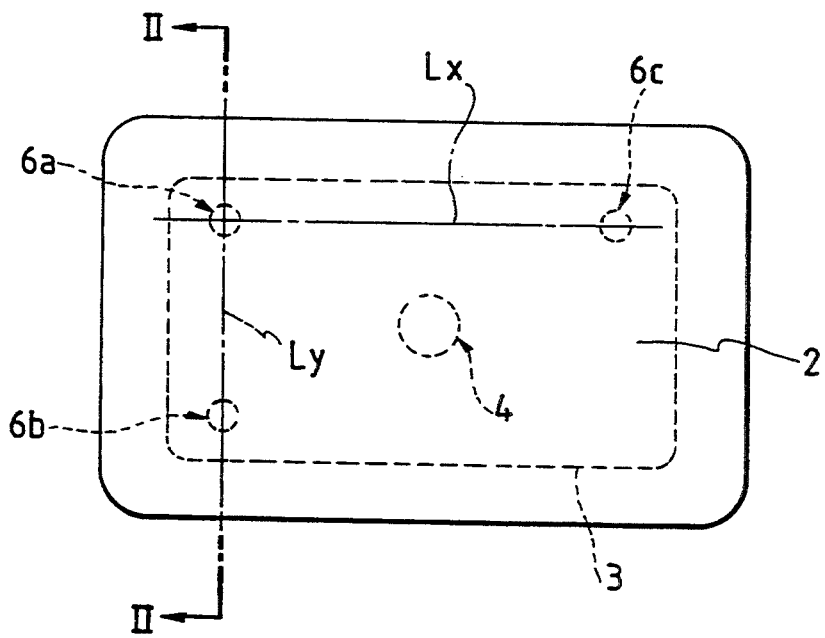
FIG. 1 is a frontal view of an automobile head lamp.
Figure 2:
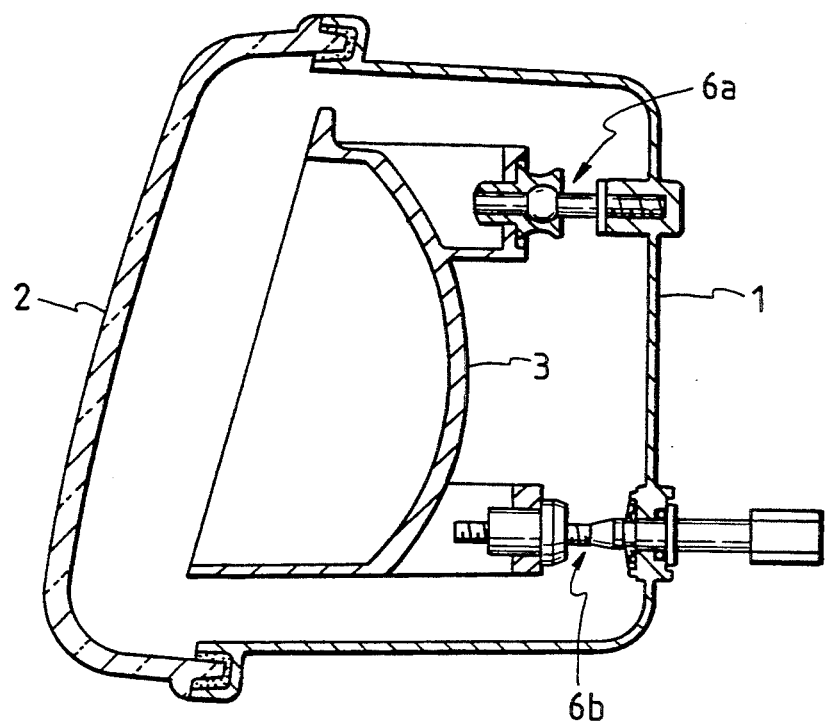
FIG. 2 is a profile of the same head lamp cut along the line II—II shown in FIG. 1.
Figure 3:
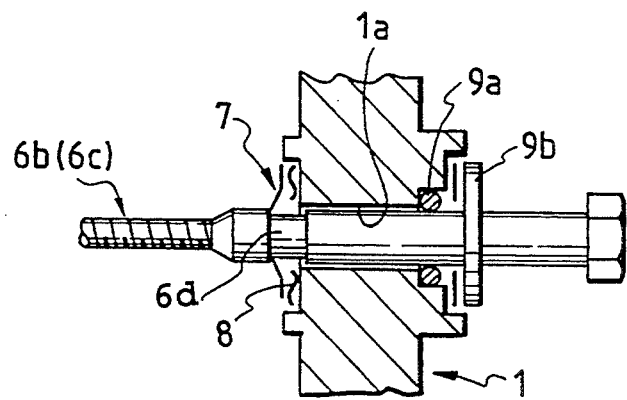
FIG. 3 is an enlarged sectional view of the aiming screw engagement portion.
Figure 4:
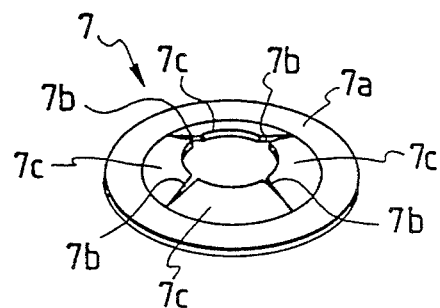
FIG. 4 is an enlarged oblique view of a conventional push-on fixer.
Figure 5:
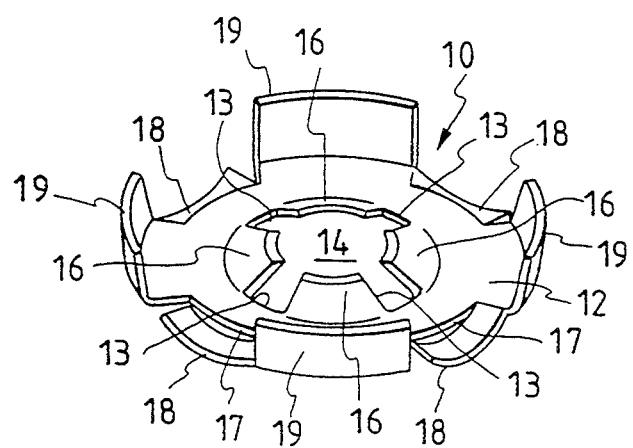
FIG. 5 is an enlarged perspective view of the push-on fixer which is a first embodiment of the present invention.

Next, an embodiment of the present invention will be explained with reference to the drawings.

FIGS. 5–8 show a first embodiment of the push-on fixer of the present invention. In these drawings, the push-on fixer 10 includes a thin discoid body 12 in which a central circular hole 14 is formed; a plurality of elastically deformable inner plate spring pieces 16 formed at the circumferential edge region of the central circular hole 14 of discoid body 12 so as to project diagonally upward; outer plate spring pieces 18 which are formed at the outer circumferential edge region of the discoid body 12 so as to bend downward; and upward projections 19 which function as aiming screw engagement release claws and which are also formed at the outer circumferential edge region of the discoid body 12 so as to project upward. In forming inner plate spring pieces 16, radially extending notches 13 are first formed in the circular hole circumferential edge region. Then, the circular hole circumferential edge region is raised obliquely upward by drawing. In forming outer plate spring pieces 18, L-shaped notches 17 are formed in the outer circumferential edge region of the discoid body 12, thereby forming circumferentially extending belt-like strip regions. Then, the belt-like strip regions are drawn downward. Upward projections 19 on the outer circumferential edge are formed by drawing outer circumferential edge projection regions upward. These projection regions subtend the same arcs as do corresponding inner plate spring pieces.

When aiming screw 20 is inserted into the circular hole 14, the inner plate spring pieces 16 on are pushed by the screw 20. Inner plate spring pieces 16 elastically deform, thereby enabling the screw 20 to be inserted smoothly. Thus, the push-on fixer 10 can be smoothly fit onto the outside of the screw 20. Moreover, after the screw 20 has been inserted, the inner plate spring pieces 16 also serve to clamp the screw 20 to thereby retain the screw 20 so as not to come off. The tips of the inner plate spring pieces 16 are sharp so as to bite into the screw, thereby enabling a secure clamping.

On the other hand, the outer plate spring pieces 18 press against a push-on fixer abutment surface 1b (which will be described later) so as to absorb any axial backlash of the aiming screw 20. Furthermore, as shown in an enlarged manner in FIG. 7, each of the outer plate spring pieces 18 is arc shaped so as to have a small contact area with the push-on fixer abutment surface 1b formed on a lamp body 1. Such a structure reduces the rotational resistance of the aiming screw 20. That is, when the push-on fixer 10 is engaged with the aiming screw 20, the inner plate spring pieces 16 clamp the screw so that the push-on fixer 10 rotates integrally with the aiming screw 20. However, since the contact sliding area with the push-on fixer abutment surface 1b is small, the sliding friction is also small, so that the smooth rotation of the aiming screw 20 is obtained.

Upward projections 19 function as aiming screw engagement release claws in the following manner. When an outward force is exerted on the tips of the projections 19 as shown by arrow A in FIG. 8, upward projections 19 and their corresponding inner plate spring pieces 16 are bent backward to the outside, as shown by the dotted line in FIG. 8. The tips of the respective inner plate spring pieces 16 are thus displaced in directions of mutual separation (i.e., away from central hole 14). Consequently, when a cylindrical jig 30 is pushed against the push-on fixer the projections 19 are extended radially outward by forward tapered surfaces 32 of the jig 30. The respective plate spring pieces 16 thus deform and bend backward to the outside, the central hole 14 is widened, and the clamping of the aiming screw by the inner plate spring pieces 16 can be easily released.

The aiming screw 20 is constituted mainly by a forward male screw 21 which fits together with a nut on a reflector side (not illustrated); a straight portion 22 which is supported by a screw insertion hole 1a formed in the lamp body 1; and a rotation controlling portion 23 which projects toward the rear side of the lamp body 1. Between the straight portion 22 and the rotation controlling portion 23, a flange 24 is formed for setting the degree of insertion of the screw 20 into the lamp body. In the state shown in FIG. 6 where the aiming screw 20 is inserted into the screw insertion hole 1a, a sliding washer 9b made of polyester film containing graphite is interposed between the lamp body 1 and flange 24, and a waterproofing O-ring 9a is provided around the rear-side opening of the screw insertion hole 1a.

A constricted portion 25 is formed at the front of the straight portion 22 of the screw. The push-on fixer 10 is interposed between this constricted portion 25 and the push-on fixer abutment surface 1b.

Figure 6:
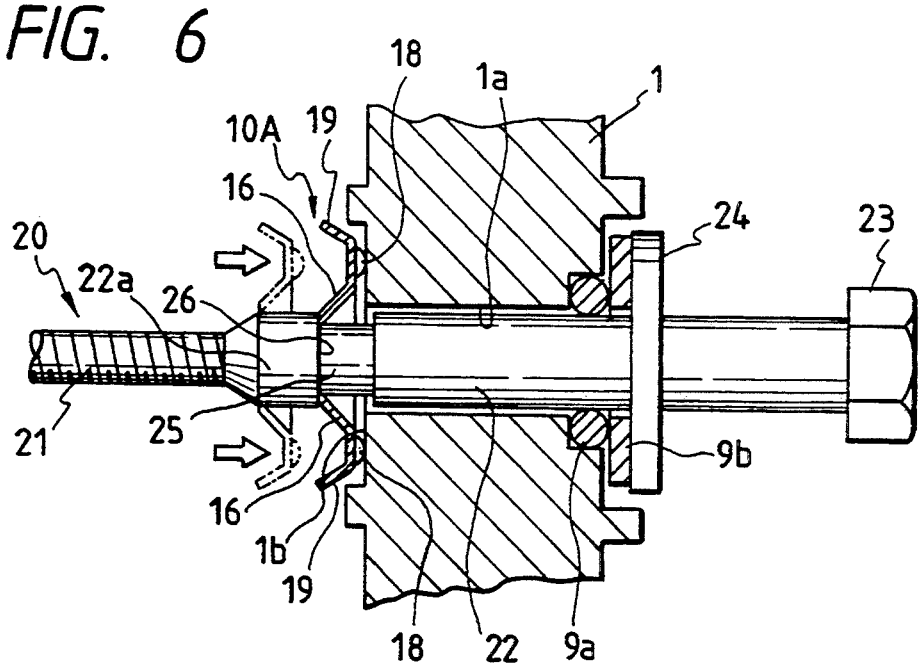
FIG. 6 is an enlarged sectional view of the aiming screw bearing portion which uses the push-on fixer of FIG. 5.
Figure 7:
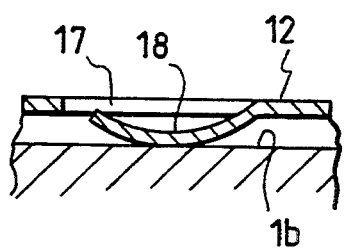
FIG. 7 is an enlarged view of a plate spring piece which is formed by cutting-up the outer circumferential edge of the discoid body of the push-on fixer.

When the push-on fixer 10 is externally fitted onto the insert aiming screw 20, the inner plate spring pieces 16 are elastically deformed as shown by the imaginary lines in FIG. 6, so as to clear a bulging straight portion 22a to be fitted to the constricted portion 25. The inner plate spring pieces 16 then clamp the constricted portion 25 so that the tips of the inner plate spring pieces 16 contact a step portion 26, thereby fixing the screw 20 in the axial direction. At the same time, the outer plate spring pieces 18 press against the push-on fixer abutment surface 1b to absorb any axial backlash.

Figure 8:
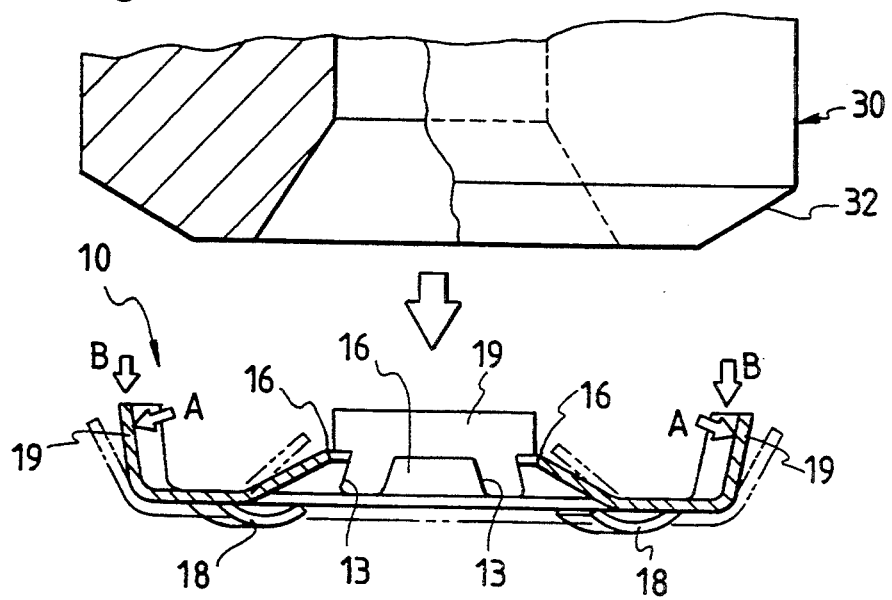
FIG. 8 is an explanatory view which explains the circumstances where the clamping of the aiming screw by the plate spring pieces of the circular hole side of the push-on fixer is released.

To remove the push-on fixer 10, the jig 30 shown in FIG. 8 is used. If the jig 30 is pressed against the tips of the projections 19 of the push-on fixer 10 in a state where the aiming screw 20 is inserted, the tips of the inner plate spring pieces 16 extend outwardly, and the engagement between the inner plate spring pieces 16 and the step portion 26 can be easily released.

In the foregoing embodiment, in order to widen the circular hole 14 (i.e., in order to release the clamping of the aiming screw by the inner plate spring pieces 16), an outward force is exerted on the upward projections 19 (see arrow A in FIG. 8). However, since the upward projections 19 project obliquely, even the exertion of a vertical downward force (see arrow B in FIG. 8) is able to widen the circular hole 14.

Moreover, in the foregoing embodiment, the inner plate springs 16 are elastically deformed together with the upward projections 19, so that the inner plate springs 16 are opened. Moreover, it is also acceptable to open the inner plate spring pieces 16 by subjecting them to plastic deformation.

Figure 9:
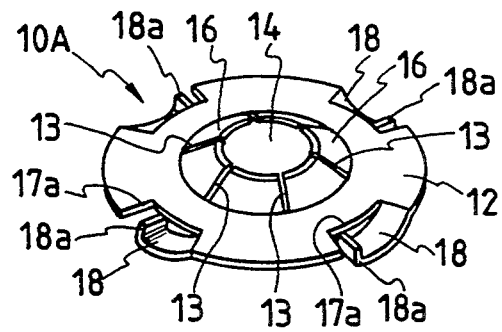
FIG. 9 is an enlarged perspective view of a push-on fixer, which is a second embodiment of the device.
Figure 10:
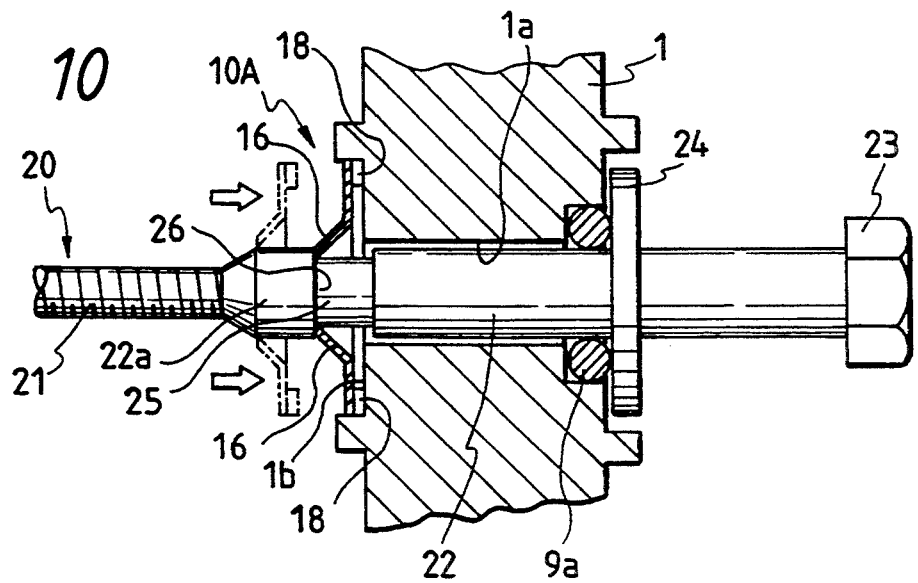
FIG. 10 is an enlarged sectional view of an aiming screw support portion to which the push-on fixer is applied.
Figure 11:
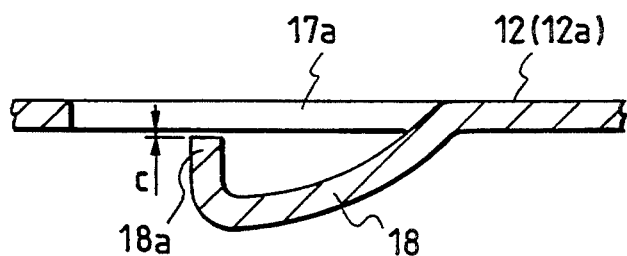
FIG. 11 is an enlarged sectional view of a plate spring piece on an outer circumferential edge side of a discoid body, which is an essential part of the push-on fixer.
Figure 12:
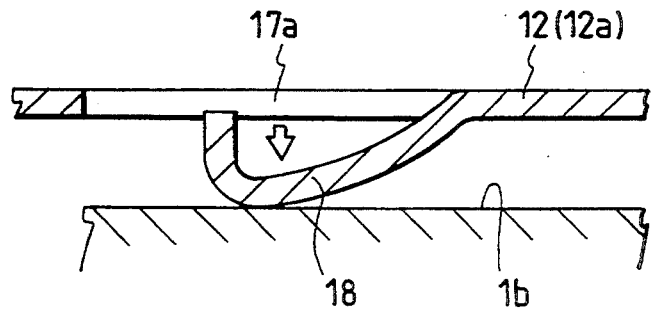
FIG. 12 is a sectional view for explaining how the plate spring piece is operated.

FIGS. 9 to 12 show a push-on fixer, which is a second embodiment of the device. FIG. 9 is a perspective view of the push-on fixer; FIG. 10 is a sectional view of an aiming screw support portion having the push-on fixer mounted; FIG. 11 is an enlarged sectional view of a plate spring piece on the outer circumferential edge side of a discoid body, which is an essential part of the push-on fixer; and FIG. 12 is a sectional view for explaining how the plate spring piece is operated.

In these drawings, a push-on fixer 110A includes: a thin discoid body 112 having a circular hole 114 formed at a center portion thereof; a plurality of elastically deformable plate spring pieces 116, each extending diagonally upward; and plate spring pieces 118, each bending downward at an outer circumferential edge region of the discoid body 112. Each plate spring piece 116 on the circular hole side is formed by first forming radially extending notches 113 in the circumferential edge region of the circular hole and then raising obliquely upward by drawing the circumferential edge region of the circular hole. On the other hand, each plate spring piece 118 on the outer circumferential edge side of the discoid body is formed by first forming an L-shaped notch 117a in the outer circumferential edge region of the discoid body to thereby form a circumferentially extending belt-like strip region, and then drawing downward the belt-like strip region.

The plate spring pieces 116 on the circular hole side permit smooth insertion of an aiming screw 120, which will be described later. At the time of inserting the aiming screw 120 into the circular hole 14, the plate spring pieces 116 are deformed while biased by the screw 120 that is pushed in. That is, the plate spring pieces 116 facilitate the push-on fixer 110A to be fitted smoothly with the screw 120 from outside. Once the screw 120 has been completely inserted, the plate spring pieces 116 also hold the screw 120 in order to prevent the screw 120 from coming off by clamping the screw. The distal end portions of the plate spring pieces 116 are sharp enough to allow themselves to be cut into the screw so that the screw can be clamped thereby without fail. On the other hand, the plate spring pieces 118 on the outer circumferential edge side of the discoid body absorb axial play of the aiming screw 120 by coming in pressure contact with a push-on fixer attaching surface 101b, which will be described later.

Further, as shown in FIG. 11 in enlarged form, the plate spring piece 118 is formed in an arcuate shape that projects downward so as to have a small contact area with the push-on fixer attaching surface 1b formed on a lamp body 101 to reduce the rotational resistance of the aiming screw 120. That is, the push-on fixer 110A rotates integrally with the aiming screw 120 when used to engage the aiming screw 120 since the plate spring pieces 116 clamp the screw. However, since the area of contact and sliding of the push-on fixer with the push-on fixer attaching surface 101b is small, the sliding friction thereof is also small, which thus allows smooth rotation of the aiming screw 120.

The aiming screw 120 engaged with the push-on fixer 110A consists mainly of a male screw portion 121 on the distal end side, a straight portion 122, and a rotating operation portion 123. The male screw portion 121 is fitted into a nut (not shown) on the side of a reflector; the straight portion 122 is rotatably supported by a screw insertion hole 101a formed in the lamp body 101; and the rotating operation portion 123 projects from the back of the lamp body 101. Between the straight portion 122 and the rotating operation portion 123 is a flange 124 for setting an amount of insertion of the screw 120 into the lamp body. Along the circumferential edge portion of the opening of the screw insertion hole 101a on the back of the lamp body is an annular recess. A watertight O ring 109a, which is a seal member, is attached to this recess. The outer circumferential edge portion of the flange 124 which leaves the O ring 109a compressed is abutted against the lamp body 101, thereby allowing the aiming screw to be rotated smoothly as well as stably. As a result, a sliding washer conventionally required at the aiming screw support portion can be dispensed with.

Further, on the distal end side of the straight portion 122 of the aiming screw 120 is a constricted portion 125. The push-on fixer 110A is fitted into a space between the constricted portion 125 and the push-on fixer attaching surface 101b formed at the circumferential edge portion of the opening of the screw insertion hole 1a on the inner surface side of the lamp body.

As shown by the phantom line in FIG. 10, the push-on fixer 110A can be fitted into the constricted portion 125 by surpassing a bulging straight portion 122a with plate spring piece 116 being elastically deformed at the time of fitting from outside the push-on fixer with the aiming screw 120 inserted into the lamp body insertion hole 101a. At this time, not only the plate spring pieces 116 clamp the constricted portion 125, but also the distal end portions of the plate spring pieces 116 are abutted against a step 126 to prevent the screw 120 from coming off in the axial direction.

In addition, as shown in FIG. 12, the plate spring pieces 118 come in pressure contact with the push-on fixer attaching surface 1b to absorb the play of the screw in the axial direction.

Further, each plate spring piece 118 formed at the outer circumferential edge of the discoid body 112 is folded back upward so that the distal end portion thereof is perpendicular to the main body 112a of the discoid body. In addition, as shown in FIG. 11, a gap "c" between a distal end portion 118a of the plate spring piece 118 and the main body 112a of the discoid body is formed so as to be smaller than the thickness "t" of the plate spring piece 118 so that a plate spring piece 118 of the other push-on fixer is hard to enter into such gap between the plate spring piece 118 and the main body 112a of the discoid body.

Figure 13:
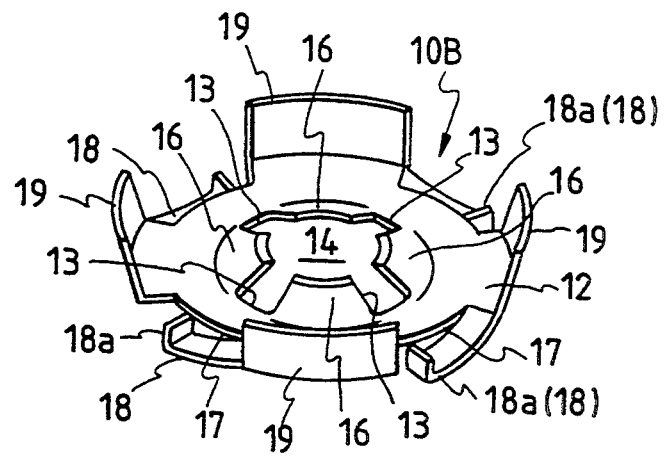
FIG. 13 is an enlarged perspective view of a push-on fixer, which is a third embodiment of the device.
Figure 14:
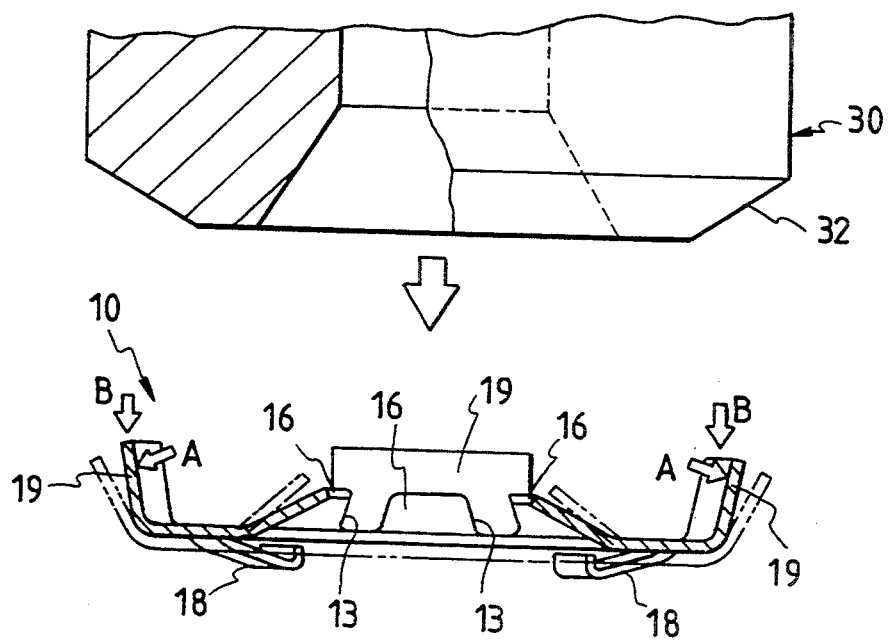
FIG. 14 is a diagram for explaining how the push-on fixer is removed.

FIGS. 13 and 14 show a push-on fixer, which is a third embodiment of the device. FIG. 13 is an enlarged perspective view of the push-on fixer; and FIG. 14 is a diagram for explaining how the clamping of the aiming screw by the push-on fixer is released.

A push-on fixer 110B in the third embodiment is characterized in that upward extending portions 119, which are aiming screw engagement release claws, are provided at an outer circumferential edge portion of the discoid body 112. That is, at a position corresponding to each plate spring piece 116 on the outer circumferential edge portion of the discoid body 112 is the upward extending portion 119, whose structure is such that the outer circumferential edge portion of the discoid body 112 is raised upward. As shown in FIG. 14, this extending portion 119 reacts with an outward force applied to the distal end thereof in such a manner that a region extending from the extending portion 119 to the plate spring piece 116 folds back outward as shown by the phantom line in FIG. 14. As a result, the distal end portions of the plate spring pieces 116 are displaced so as to move away from one another. Therefore, when the extending portion 119 is opened out in the radial direction using a tapered surface 132 on the tip of a cylindrical tool 130 by pushing the tool 130 in the axial direction, the respective plate spring pieces 116 deform so as to fold back outward, which in turn widens the circular hole 114 and thereby allows the clamping of the aiming screw by the plate spring pieces 116 to be released with ease.

Further, the gap between the distal end portion of each plate spring piece and the main body of the discoid body is smaller than the thickness of the plate spring piece, the distal end portion of each plate spring piece being formed on the outer circumferential side of the discoid body and coming in pressure contact with the push-on fixer attaching surface. Therefore, this gap does not allow a plate spring piece of other push-on fixers to enter, the plate spring piece coming in pressure contact with the push-on fixer attaching surface. As a result, there will be no such inconvenience that the respective plate spring pieces, i.e., the respective push-on fixers are entangled with each other, hence facilitating the handling of the push-on fixers.

As is clear from the above explanation, with regard to the push-on fixer for aiming screw engagement of the present invention, in addition to fixing the aiming screw in place, the push-on fixer also absorbs axial backlash. Consequently, the number of parts of the lamp body insertion portion is reduced, the structure of the aiming screw bearing portion of the lamp body becomes correspondingly simpler, and the installation of the aiming screw in the lamp body becomes easy.

Moreover, by subjecting the aiming screw clamp release claws to outward elastic or plastic deformation, the engagement of the push-on fixer and the aiming screw can be simply released. Consequently, since attachment and removal of the aiming screw is easy, disassembly and repair of the aiming screw bearing portion becomes convenient, thereby augmenting the recyclability of the parts.

What is claimed is:

1. A push-on fixer for engagement of an aiming screw with a lamp body, the aiming screw including a bulging straight portion and a constricted portion, the push-on fixer comprising:

a thin discoid body having a circular hole formed at a center portion thereof for insertion of the aiming screw;

at least one elastically deformable first plate spring piece disposed at an inner circumferential edge region of said circular hole of said discoid body, for fixing the aiming screw upon insertion of said aiming screw in said circular hole;

at least one second plate spring piece disposed at an outer circumferential edge region of said discoid body, engaging a surface of said lamp body, for preventing axial backlash of the aiming screw; and at least one aiming screw engagement release claw formed at the outer circumferential edge region of said discoid body for releasing the aiming screw from engagement with said first plate spring piece.

2. The push-on fixer according to claim 1, wherein said first plate spring piece projects upward from an upper face of said thin discoid body at an angle from a longitudinal axis of said circular hole, said second plate spring piece bends downward away from a lower face of said thin discoid body, and said aiming screw engagement release claw projects upward from said upper face.

3. The push-on fixer according to claim 1, wherein four of said first plate spring pieces, four of said second plate spring pieces, and said aiming screw engagement release claws are provided.

4. The push-on fixer according to claim 1, wherein said first plate spring piece is formed by first forming radially extending notches in the inner circumferential edge region thereby forming a plurality of spring members, and then raising said spring members obliquely upward away from an upper face of said thin discoid body; said second plate spring piece is formed by forming an L-shaped notch in the outer circumferential edge region of said discoid body thereby forming a circumferentially extending belt-like region, and then drawing downward said belt-like strip region from a lower face of said thin discoid body; and said aiming screw engagement release claw is formed by drawing upward from said upper face an outer circumferential edge projection region subtending an arc corresponding to said first plate spring piece.

5. The push-on fixer according to claim 1, wherein said second plate spring piece is formed in an arcuate shape so as to have a small contact area with the lamp body.

6. The push-on fixer according to claim 1, wherein the push-on fixer is mounted on the constricted portion of the aiming screw.

7. The push-on fixer according to claim 1, wherein said first plate spring piece is opened by subjecting said first plate spring piece to plastic deformation.

8. The push-on fixer according to claim 1, wherein a plurality of said first plate spring pieces, a plurality of said second plate spring pieces, and a plurality of said aiming screw engagement release claws are provided all in the same number.

9. The push-on fixer according to claim 2, wherein a plurality of said first plate spring pieces, a plurality of said second plate spring pieces, and a plurality of said aiming screw engagement release claws are provided all in the same number.

10. The push-on fixer according to claim 4, wherein a plurality of said first plate spring pieces, a plurality of said second plate spring pieces, and a plurality of said aiming screw engagement release claws are provided all in the same number.

* * * * *